Henry Mee
Fan and Fly Brush.
No. 118,870.  Patented Sep. 12, 1871.
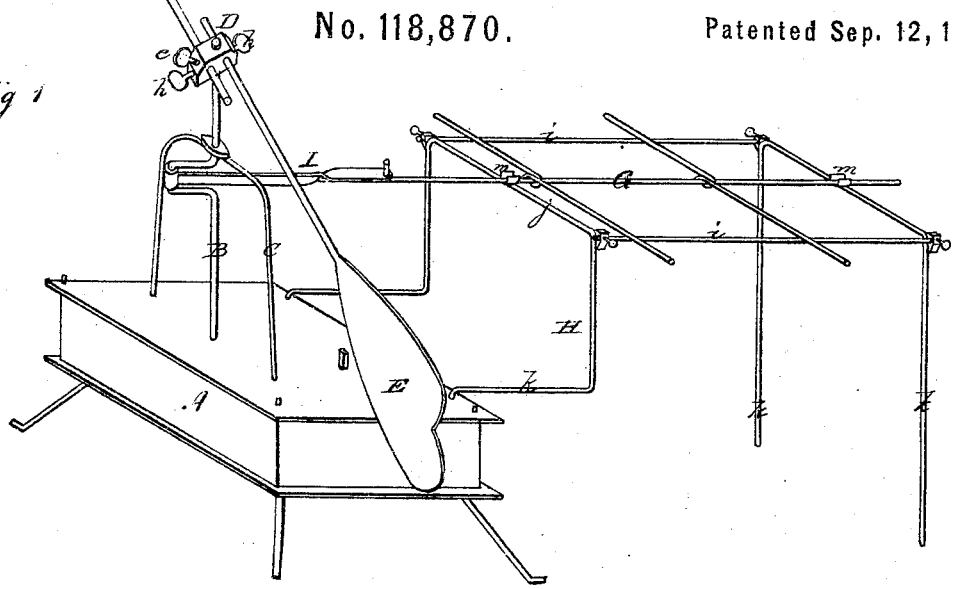
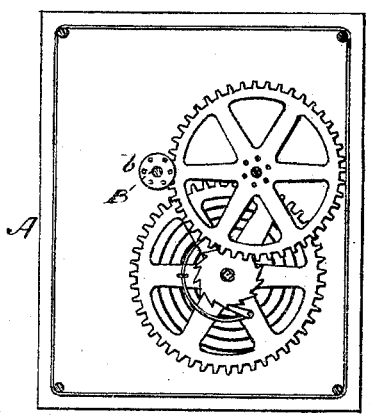
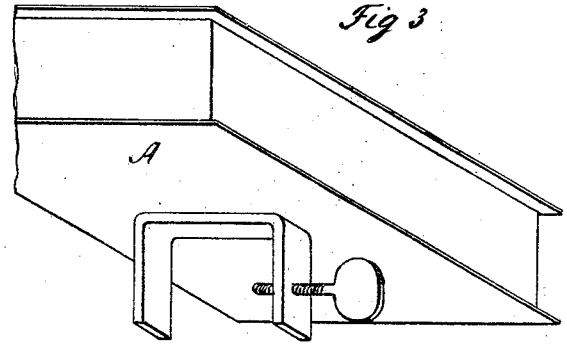
Witness
Phil. T. Dodge
Harry King.
Inventor
Henry Mee
by Dodge & Munn
Attys.

UNITED STATES PATENT OFFICE.

HENRY MEE, OF CROWN POINT, INDIANA.

IMPROVEMENT IN FANS AND FLY-BRUSHES COMBINED.

Specification forming part of Letters Patent No. 118,870, dated September 12, 1871.

*To all whom it may concern:*

Be it known that I, HENRY MEE, of Crown Point, in the county of Lake and State of Indiana, have invented certain Improvements in Fly-Beater and Cooler, of which the following is a specification, reference being had to the accompanying drawing.

My invention consists in a novel combination and arrangement of spring clock-work with a rotary fan and a reciprocating frame provided with streamers or brushes, as hereinafter described.

Figure 1 is a perspective view of my device. Fig. 2 is a horizontal section through the body of the same, containing the clock-work; and Fig. 3 is a perspective view of the body from the under side, showing the clamp thereon.

In constructing my device, I first provide a suitable box or body, A, supported on legs $a$, and mount therein an ordinary train of clock-work or gearing, operated by a spring. I next provide a crank-shaft, B, and mount its lower end in the body, and provide it with a pinion, $b$, gearing into and operated by the clock-work, as shown at Fig. 2. The upper end of the shaft I support by an arm or frame, C, secured upon the body. On the upper end of the shaft I place a metal block, D, provided with a thumb-screw, $e$, so that it may be adjusted up and down on the shaft and fastened at any point. Through the block D I make two transverse parallel holes, and then provide two fan-blades, E, with long stems $g$, and insert the stems through the block, as shown, so as to support the two blades on opposite sides of the shaft, as shown. I also provide the block with two thumb-screws, $h$, by which the fan-stems may be fastened.

When the clock-work is set in motion the blades are carried around and serve as fans for setting a current of air in motion. After first loosening the thumb-screws $h$ the blades may be adjusted at any desired angle to the plane of revolution, and set nearer to or further from the center, as desired. By thus adjusting the blades the force and direction of the current of air and the speed of the blades may be regulated at will.

I next provide a light frame, H, consisting of two parallel horizontal wires, $i$, connected by cross-wires $j$ and supported on four legs, $k$, two of the legs being set down through holes in the body A, as shown. The cross-wires $j$ I provide, each at its middle, with a U-shaped block or bearing, $m$, as shown; and in these bearings I mount a rod, G, provided with lateral arms, and connect it by a pitman, I, with the crank of shaft B, as shown in Fig. 1, so that, as the shaft revolves with the fans, it also moves the rod G with its arms back and forth on frame H. To the rod G and its arms ribbons, streamers, or brushes may be attached to frighten and drive away all flies and other insects in the vicinity. Ribbons may also be attached to the rotary fan for like purpose. The wires $i$ of frame H are held in place by thumb-screws, as shown, so that the length of the frame can be changed at will.

My device, constructed in the manner described, combining both fan and fly-brush, will be found of great service on the dining-table and by the sick-bed. When used on a small table, or when a fan only is required, the frame H and the sliding rod G may be detached and removed.

To the under side of the body I attach a clamp and thumb-screw, by which the device may be fastened to the head of a bed, back of a chair, or in other similar places.

Having thus described my invention, what I claim is—

1. In combination with the crank B of the driving mechanism, the reciprocating rod G, having cross-bars attached and supported on the frame H, as set forth.

2. The extension frame H, consisting of the supports $k$ and the sliding rods $i$, held in place by set-screws, as herein described.

HENRY MEE.

Witnesses:
   WM. H. LOTZ,
   G. LOTZ.